United States Patent
Krauss et al.

(10) Patent No.: US 11,166,148 B2
(45) Date of Patent: Nov. 2, 2021

(54) METHOD FOR RESOURCE MANAGEMENT IN A VEHICLE-BASED MOBILE COMMUNICATIONS UNIT

(71) Applicant: Bayerische Motoren Werke Aktiengesellschaft, Munich (DE)

(72) Inventors: Thomas Krauss, Munich (DE); Peter Fertl, Munich (DE); Markus Kaindl, Neubiberg (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 15/271,844

(22) Filed: Sep. 21, 2016

(65) Prior Publication Data
US 2017/0013675 A1 Jan. 12, 2017

Related U.S. Application Data

(63) Continuation of application No. PCT/EP2015/052413, filed on Feb. 5, 2015.

(30) Foreign Application Priority Data

Apr. 3, 2014 (DE) ............ 10 2014 206 393.0

(51) Int. Cl.
*H04W 76/34* (2018.01)
*H04W 8/18* (2009.01)
(Continued)

(52) U.S. Cl.
CPC ............ *H04W 8/18* (2013.01); *H04W 76/15* (2018.02); *H04W 76/34* (2018.02); *H04W 88/06* (2013.01)

(58) Field of Classification Search
CPC .................................. H04W 76/34
See application file for complete search history.

(56) References Cited

U.S. PATENT DOCUMENTS

| 2004/0031058 A1 | 2/2004 | Reisman | |
| 2008/0186903 A1* | 8/2008 | Hedberg | H04L 61/304 370/319 |

(Continued)

FOREIGN PATENT DOCUMENTS

| CN | 101184290 A | 5/2008 |
| CN | 102770779 A | 11/2012 |

(Continued)

OTHER PUBLICATIONS

German-language Search Report issued in counterpart German Application No. 10 2014 206 393.0 dated Aug. 14, 2014 with partial English translation (12 pages).

(Continued)

*Primary Examiner* — Kodzovi Acolatse
*Assistant Examiner* — The Hy Nguyen
(74) *Attorney, Agent, or Firm* — Crowell & Moring LLP

(57) ABSTRACT

A method for resource management in a vehicle-based mobile communications unit. In the method, during a mobile communication transaction conducted via two simultaneously established mobile communication channels, the user-nonspecific data components of the currently active identity profile are compared with one another to determine the mobile communication services provider currently being used. In case of a mobile communication services provider identity determined within the context of the comparison, one of the mobile communication channels is switched off and the mobile communications are conducted via the other mobile communication channel.

9 Claims, 2 Drawing Sheets

(51) Int. Cl.
*H04W 76/15* (2018.01)
*H04W 88/06* (2009.01)

(56) References Cited

U.S. PATENT DOCUMENTS

| | | | |
|---|---|---|---|
| 2010/0279698 A1 | 11/2010 | Wong | |
| 2011/0077031 A1 | 3/2011 | Kim et al. | |
| 2013/0012135 A1 | 1/2013 | Ruohonen et al. | |
| 2013/0079000 A1* | 3/2013 | Syrjarinne | G01S 19/05 455/427 |
| 2013/0329639 A1* | 12/2013 | Wietfeldt | H04W 88/06 370/328 |
| 2014/0245003 A1* | 8/2014 | Barker | H04L 63/08 713/168 |
| 2014/0248872 A1* | 9/2014 | Sun | H04W 8/04 455/433 |
| 2015/0029987 A1* | 1/2015 | Addepalli | H04W 4/046 370/329 |
| 2015/0139181 A1* | 5/2015 | Cheng | H04W 36/14 370/331 |
| 2015/0141012 A1* | 5/2015 | Ramkumar | H04W 48/20 455/435.3 |
| 2015/0171910 A1* | 6/2015 | Gao | H04B 1/3816 455/406 |
| 2016/0112578 A1* | 4/2016 | Yang | H04W 48/16 455/432.1 |

FOREIGN PATENT DOCUMENTS

| | | |
|---|---|---|
| EP | 0 899 890 A2 | 3/1999 |
| GB | 2495985 A | 5/2013 |
| WO | WO 01/43460 A2 | 6/2001 |
| WO | WO 2011/104580 A1 | 9/2011 |
| WO | WO 2014/113325 A1 | 7/2014 |

OTHER PUBLICATIONS

International Search Report (PCT/ISA/210) issued in PCT Application No. PCT/EP2015/052413 dated Apr. 24, 2015 with English translation (8 pages).
German-language Written Opinion (PCT/ISA/237) issued in PCT Application No. PCT/EP2015/052413 dated Apr. 24, 2015 (5 pages).
English translation of Chinese Office Action issued in counterpart Chinese Application No. 201580011940.3 dated Oct. 25, 2018 (three (3) pages).

* cited by examiner

METHOD FOR RESOURCE MANAGEMENT IN A VEHICLE-BASED MOBILE COMMUNICATIONS UNIT

CROSS REFERENCE TO RELATED APPLICATIONS

This application is a continuation of PCT International Application No. PCT/EP2015/052413, filed Feb. 5, 2015, which claims priority under 35 U.S.C. § 119 from German Patent Application No. 10 2014 206 393.0, filed Apr. 3, 2014, the entire disclosures of which are herein expressly incorporated by reference.

BACKGROUND AND SUMMARY OF THE INVENTION

Embodiments of the invention relate to a method for resource management in a vehicle-based mobile communications unit, the memory of which stores a plurality of activatable identity profiles each including a user-specific and a user-non-specific data component, and which has a modem device which can be used to establish, using a respective identity profile, at least two simultaneous mobile communications channels to mobile communications networks belonging to mobile communications service providers which can be used to provide mobile communications services, the method being carried out in an automated manner by a control unit of the mobile communications unit.

WO 2011/104580 A1 discloses a mobile communications unit which is integrated in a motor vehicle and can be used to simultaneously establish two mobile communications channels and additionally satellite communication with a satellite navigation system. In order to establish a plurality of simultaneous mobile communications channels, the known mobile communications unit has a corresponding modem device. The latter may comprise a plurality of individual modems which can each be used to establish a mobile communications channel. Alternatively, the modem device may also have a multichannel modem which can be used to simultaneously establish a plurality of mobile communications channels. These are referred to as dual-modem or multiple-modem installations, for example.

The modem device is connected to external antennas of the motor vehicle, via which the different communications channels to mobile communications networks belonging to mobile communications service providers are established in a predefined frequency band. A mobile communications channel is established in each case by activating an identity profile, a plurality of which are stored in a memory of the mobile communications unit. For example, such identity profiles are stored in one or more "Subscriber Identity Modules", SIMs, in particular in the form of so-called SIM cards. An important part of a SIM is the identity profile which is also known as the IMSI and typically comprises a country-specific data component (MCC), a network-specific data component (MNC) and a user-specific data component. An established communications channel is defined via the identity profile which is respectively activated for it and which can be selected in a site-specific manner, for example. The compilation of previously stored identity profiles pre-defines in what countries a particular user can access what services from which service providers according to his mobile communications contracts concluded in advance.

In the known method, the possibility of setting up a plurality of simultaneous mobile communications channels is used to obtain as much additional information as possible which is as precise as possible and can be used to convert the satellite data received via the satellite navigation interface into current position information relating to the motor vehicle in a particularly fast and precise manner and to calculate a route which is as favorable as possible.

Such additional information and other vehicle-specific information is often provided as mobile communications services by the vehicle manufacturer or by mobile communications service providers on behalf of the vehicle manufacturer.

Irrespective of this, users of the vehicle may also be interested in establishing a separate mobile communications channel, for example in order to use individual mobile communications services such as telephony or mobile Internet access. For example, a vehicle-based mobile communications small cell or a mobile hotspot which uses a mobile communications channel can be provided (the term of mobile communications small cell used here may denote an individual apparatus or a cell, as defined in the 3GPP standard as "Home eNB", for example a microcell, a picocell, a femtocell or the like; so-called "Relay Nodes", as defined in the 3GPP standard in Release 10 and above, are also intended to be included in the term). Therefore, one of the mobile communications channels which can be established simultaneously is usually used for vehicle-manufacturer-specific mobile communication and the other mobile communications channel is used for the vehicle-user-specific mobile communication. The identity profiles used for this purpose are different in any case; they differ at least in their user-specific data components since these identify the vehicle manufacturer in one case and the vehicle user in the other case.

The disadvantage is that the performance of the overall system is often restricted by the performance of shared components, for example the antennas, with the result that the performance of each individual mobile communications channel is weakened in the case of a plurality of simultaneously established mobile communications channels. In particular, an increased energy consumption is associated with the simultaneous establishment of a plurality of mobile communications channels.

One object of the embodiments of the present invention is to develop a method of the generic type in such a manner that the performance and energy consumption of the system are improved.

This and other objects are achieved by method for resource management in which, while carrying out mobile communication via two simultaneously established mobile communications channels, the user-non-specific data components of the currently active identity profiles are compared with one another in order to determine currently used mobile communications service providers, and in the case of mobile communications service provider identity determined during the comparison, one of the mobile communications channels is switched off and mobile communication is carried out via the other mobile communications channel.

The embodiments of the invention provide for dispensing with the simultaneous establishment of two mobile communications channels if possible and carrying out mobile communication via a common mobile communications channel. The decisive criterion for whether this channel merging is possible is whether both established mobile communications channels run to the same mobile communications service provider. This information is extracted from the user-non-specific data components of the currently active identity profiles. The latter include, in particular, a country and a service-provider or network identifier, with the result that service provider identity can be determined from these data components. The user-specific data components cannot be used for this purpose since one of the simultaneously established mobile communications channels is typically used by the vehicle manufacturer and the other is used by the vehicle user. If service provider identity is determined from the user-non-specific data components, the method merges the communication of the two channels and switches off the mobile communications channel which has become free. As a result, the entire system hardware is then available to the solely used mobile communications channel; the energy otherwise consumed by the mobile communications channel which is now switched off can also be saved.

However, the problem with this approach is that the assignment of the service provider identifier (MNC) to the service provider is not always bijective. Although a mobile communications service provider is uniquely assigned to each MNC, this does not apply the other way round since mobile communications service providers which are each allocated a plurality of MNCs definitely exist. Therefore, one development of the embodiments of the invention provides for the currently used mobile communications service providers to be determined using an assignment list which is stored in a memory of the control unit and in which user-non-specific data components of identity profiles are assigned in groups to different mobile communications service providers. Expressed in a simplified manner, the memory stores a "name list" of the mobile communications service providers with the corresponding MNCs, the comparison according to the embodiment of the invention being carried out on the basis of the assigned "names", rather than on the basis of the MNC. A person skilled in the art will understand that plain text names are not necessarily compared with one another here; other types of service provider coding in the assignment list are likewise possible.

In order to minimize the number and complexity of comparisons carried out, one embodiment of the invention provides for use to be made of the fact that the user-non-specific data components of the identity profiles each typically have a country-specific data component and a service-provider-specific data component. This is effected by virtue of the country-specific data components being compared in a first comparison step and the service-provider-specific data components being compared in a second comparison step only in the event of identity. Even though most service providers are internationally operating groups, their national sections are typically economically separate. A deviation in the country identifier (MCC) of the currently active identity profiles therefore already excludes channel merging. Therefore, there is no need for detailed examination of the MNCs. Only if the MCCs are identical is it worthwhile to further check for identity of the MNCs and the codes stored for the latter in the assignment list.

As conventional in the prior art, provision is also preferably made within the scope of the embodiments of the invention for vehicle-manufacturer-specific mobile communications services to be retrieved from one or more selected mobile communications service providers via a first mobile communications connection. User-specific mobile communications services are typically retrieved from one or more selected mobile communications service providers via a second mobile communications connection. These mobile communications connections can each be handled via a separate mobile communications channel or, if possible, according to the embodiments of the invention via a common mobile communications channel. If the case of carrying out the mobile communication of the first mobile communications connection and of the second mobile communications connection via a common mobile communications channel, which is desired according to the embodiments of the invention, occurs, connection-specific account assignment of the retrieved mobile communications services is carried out in one preferred embodiment. This is also known under the keyword "Dual Billing". According to this, it is possible to assign and bill mobile communications services, the services transmitted from a mobile communications service provider to different users via a mobile communications channel, in a user-specific manner. Despite channel merging according to the embodiments of the invention, separate billing is possible for the services retrieved on behalf of the vehicle manufacturer and on behalf of the vehicle user.

Further features and advantages of the embodiments of the invention emerge from the following specific description and the drawings.

Other objects, advantages and novel features of the embodiments of the present invention will become apparent from the following detailed description of one or more preferred embodiments when considered in conjunction with the accompanying drawings.

DETAILED DESCRIPTION OF THE DRAWINGS

Identical reference symbols in the figures indicate identical or similar elements.

Figure 1:
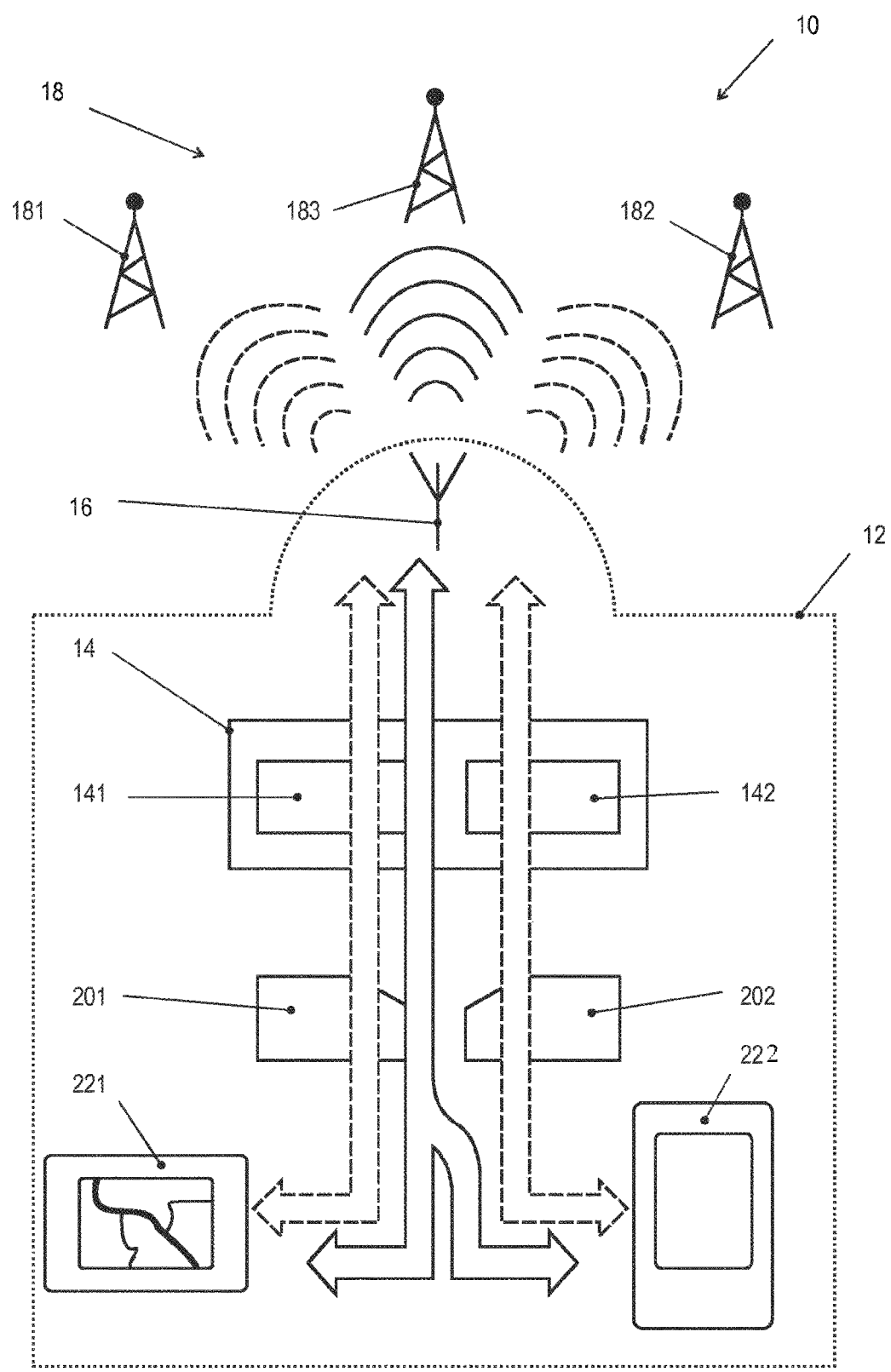
FIG. 1 is a schematic illustration of a communications system using the method according to the embodiment of the invention.

In roughly schematic form, FIG. 1 shows a communications system 10 in which the method according to the embodiments of the invention is used. The region 12 bordered by a dotted line shows hardware on the service receiver side, for example the communications system of a motor vehicle (not illustrated in any more detail) and additional vehicle user hardware. The vehicle's own hardware includes a modem device 14 which, like in the situation shown, has two individual modems 141, 142, but may also be in the form of a dual modem. The modem device 14 is connected to an antenna device 16 of the vehicle and can use it to set up mobile communication with mobile communications network hardware 18 on the provider side. Two mobile communications base stations 181, 182 are illustrated purely symbolically in FIG. 1 and are assigned to different mobile communications network operators for the purpose of the present explanation. A third mobile communications base station 183 is also illustrated, the significance of which shall be discussed further below.

Arranged upstream of the modem device 14 is a memory which stores a plurality of identity profiles 201, 202. The identity profiles are illustrated in the form of typical SIM cards in FIG. 1. However, a person skilled in the art will recognize that the identity profiles 201, 202 actually implemented as specific data structures with specific data entries can also be implemented in another manner in hardware. In particular, it is not necessary for a separate hardware element to be assigned to each identity profile; rather, it is also possible to store different identity profiles together in one hardware element.

A navigation device 221 is illustrated in FIG. 1 as an example of a vehicle-side user interface of the communications system 12. A smartphone 222 is illustrated in FIG. 1 as vehicle-independent user hardware. A person skilled in the art will recognize that both the vehicle's own communications hardware and the user's own communications hardware are fundamentally not restricted with regard to the type and number.

The vehicle's own hardware 221 typically communicates, via the first modem 141 using a first identity profile 201, with the mobile communications network structure 181 of a first mobile communications network operator with which the vehicle manufacturer has entered into certain contractual alliances in order to provide its customers with a vehicle-specific, special service. The vehicle user substantially has no influence on the selection of the mobile communications service provider or mobile communications network operator for the vehicle's own communication.

However, the vehicle user can use his own, vehicle-independent communications hardware 222 according to his own contractual obligations. In this case, he uses the second identity profile 202 and typically communicates, via the second modem 142, with the mobile communications infrastructure 182 of a second service provider or mobile communications network operator.

The two communications paths mentioned are illustrated in FIG. 1 as dashed double-headed arrows. It becomes clear that both communications paths jointly use the antenna device 16 of the vehicle, which may result in capacity collisions, in particular interference and parasitics. It goes without saying that variants in which a plurality of antennas are used are also conceivable. In this case too, performance-reducing collisions may arise if a plurality of channels are simultaneously established. The example of joint use of one antenna for both channels was selected, in particular, for reasons of clarity.

However, according to an embodiment of the invention explained further below in the detail of an exemplary embodiment, it is possible, if both communications paths lead to the same destination, that is to say to the same mobile communications service provider or mobile communications network operator, to merge said communications paths on the basis of a comparison of the identity profiles 201, 202, in particular a comparison of their user-independent data components, and to operate them only via one modem, the first modem 141 in the figure. This communications path leads in FIG. 1 to the mobile communications infrastructure 183 which does not necessarily have to differ from the mobile communications infrastructures 181, 182, but rather may be one of them.

The antenna device 16 is therefore used only by one modem 141, with the result that better communication performance can be expected overall. In addition, the energy requirement for the second modem 142 can be saved in this mode.

Figure 2:
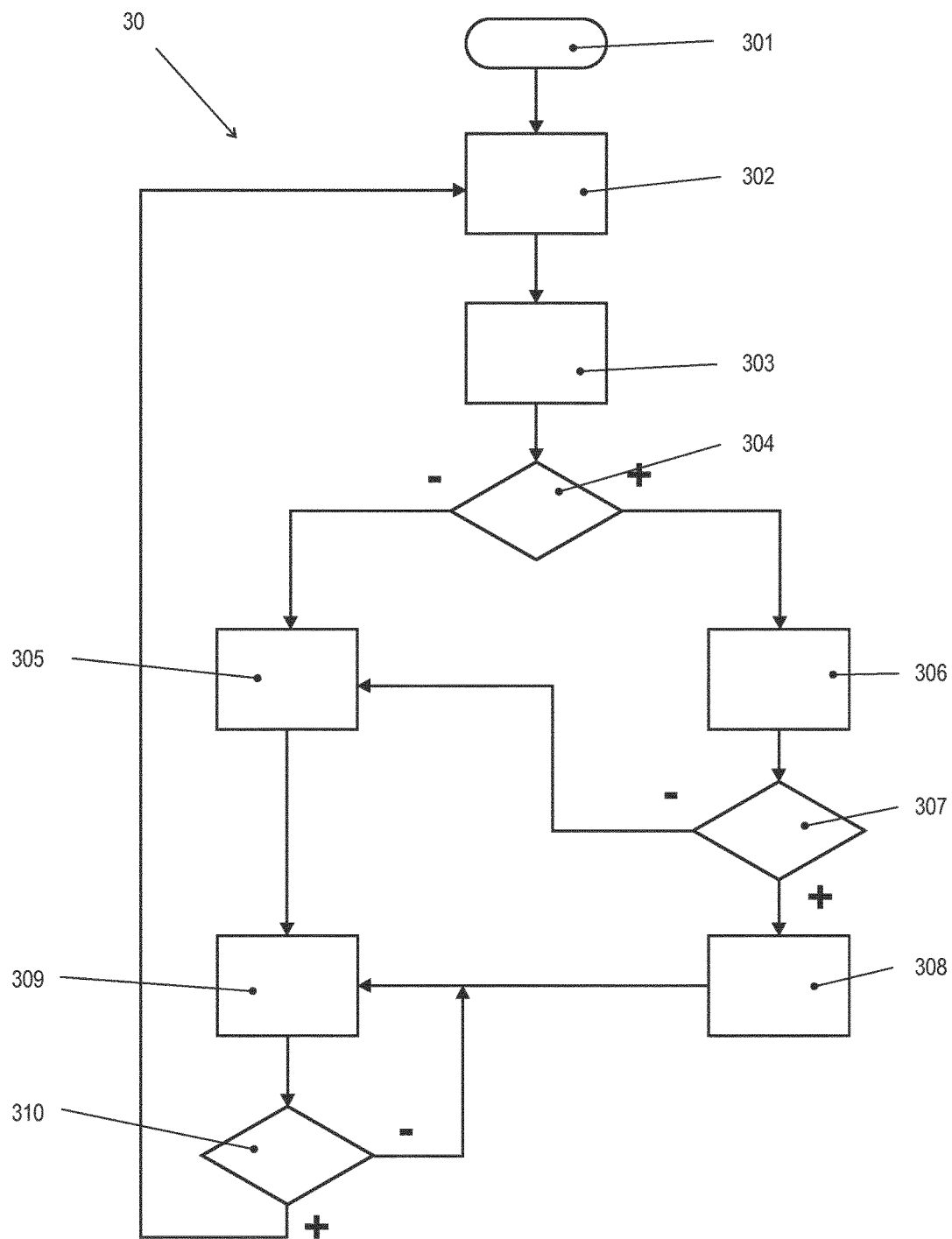
FIG. 2 is a flowchart of a method according to the embodiment of the invention.

FIG. 2 shows a flowchart 30 of the method according to an embodiment of the invention which, in its starting step 301, starts from two activated identity profiles 141, 142. In method step 302, the identity profiles, in particular the IMSIs, are read by the control unit carrying out the method. Parts of the user-independent data components of the identity profiles, in particular the IMSIs, are then compared. In the preferred embodiment in which the IMSIs each have an MNC, that is to say a country identifier, they are first of all compared with one another in step 303. If the comparison in decision step 304 results in dissimilarity of the country identifiers, the communications channels are not changed in step 305, in particular communication continues via two active identity profiles.

However, if the comparison in decision step 304 results in identity of the country identifiers, a further comparison step 306 follows. In this case, a further part of the user-independent data component of the identity profiles is checked, namely the mobile communications network operator identifier MNC. However, in one embodiment of the invention, a pure comparison of the MNCs of the identity profiles active on the two communications paths is not carried out. This is because some mobile communications network operator companies have a plurality of MNCs assigned to them in some countries. Therefore, in comparison step 306, a table which is preferably stored in the memory of the control unit, can preferably be dynamically updated and stores the MNCs in the respective country together with the associated operator name is consulted. The comparison in step 306 is carried out on the basis of the operator name.

If it is determined in decision step 307 that the mobile communications operators on the two active communications paths are different, the current communication is not changed and the method continues with step 305 described above.

If, however, operator identity is determined in step 307, one of the communications paths is switched off in step 308 and the entire communication takes place only using one identity profile and accordingly only one modem.

In step 309, the method branches from step 305 and step 308 are combined, in which case step 309 is only a waiting step which waits for a change in the active profile constellation, either the fact that one of the two profiles active according to step 305 changes or the fact that a further profile is activated in addition to the single profile which is active according to step 308. Such a change in the profile constellation can result, for example, when the user changes the mobile communications provider. As long as a profile change is not detected, decision step 310 leads to a loop with waiting step 309. If a profile change is detected, decision step 310 leads back to step 302 which has already been explained above.

The embodiments discussed in the specific description and shown in the figures are naturally only illustrative exemplary embodiments of the present invention. In light of the disclosure here, a wide range of possible variations are obvious to a person skilled in the art.

LIST OF REFERENCE SYMBOLS

10 Communications system
12 Communications hardware on the service receiver side
14 Modem device
141 First modem
142 Second modem
16 Antenna device
18 Mobile communications network infrastructure
181 Base station
182 Base station
183 Base station
201 First identity profile
202 Second identity profile
221 Vehicle's own communications hardware
222 User's own communications hardware
30 Flowchart
301 Starting step 302 Reading step
303 Comparison step
304 Decision step
305 Continuation step
306 Comparison step
307 Decision step
308 Changeover step
309 Waiting step
310 Decision step The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for resource management in a vehicle-based mobile communications unit, the method comprising:
    storing in a memory an assignment list which includes a plurality of activatable identity profiles each comprising a user-specific and a user-non-specific data component, the assignment list including service provider identifiers;
    establishing, using a modem device with a respective identity profile, at least two simultaneous mobile communications channels to mobile communications networks belonging to mobile communications service providers which provide mobile communications services, the method being carried out in an automated manner by a control unit of the mobile communications unit, wherein
    while carrying out mobile communication via two simultaneously established mobile communications channels:
        i) comparing components of currently active identity profiles with one another in order to determine currently used mobile communications service providers, and
        ii) determining whether or not the mobile communications service providers are the same using a first step during which country identifiers of the currently active identity profiles are compared and only in response to a match being found in the first step the comparison proceeds to a second step during which the service provider identifiers of the currently active identity profiles stored on the list are compared, and in case it is determined that mobile communications service providers are the same, one of the mobile communications channels is switched off and mobile communication is carried out via the other mobile communications channel.

2. The method as claimed in claim 1, wherein the assignment list includes a plurality of user-non-specific data components of identity profiles that are assigned in groups to different mobile communications service providers.

3. The method as claimed in claim 2, wherein the user-non-specific data components of the identity profiles each have the country identifiers and the service provider identifiers.

4. The method as claimed in claim 3, wherein the modem device comprises a plurality of individual modems which establish a mobile communications channel.

5. The method as claimed in claim 3, wherein the modem device has a multichannel modem which simultaneously establishes a plurality of mobile communications channels.

6. The method as claimed in claim 5, wherein vehicle-manufacturer-specific mobile communications services are retrieved from one or more selected mobile communications service providers via a first mobile communications connection.

7. The method as claimed in claim 6, wherein vehicle-user-specific mobile communications services are retrieved from one or more selected mobile communications service providers via a second mobile communications connection.

8. The method as claimed in claim 6, wherein if the mobile communication of the first mobile communications connection and of the second mobile communications connection is carried out via a common mobile communications channel, connection-specific account assignment of the retrieved mobile communications services is carried out.

9. The method as claimed in claim 7, wherein if the mobile communication of the first mobile communications connection and of the second mobile communications connection is carried out via a common mobile communications channel, connection-specific account assignment of the retrieved mobile communications services is carried out.

* * * * *